(12) United States Patent
Torkildsen

(10) Patent No.: US 7,149,672 B2
(45) Date of Patent: Dec. 12, 2006

(54) METHOD OF COMBINING SPATIAL MODELS

(75) Inventor: Torgeir Torkildsen, Trondheim (NO)

(73) Assignee: Statoil ASA, Stavanger (NO)

( * ) Notice: Subject to any disclaimer, the term of this patent is extended or adjusted under 35 U.S.C. 154(b) by 637 days.

(21) Appl. No.: 10/277,616

(22) Filed: Oct. 22, 2002

(65) Prior Publication Data

US 2003/0101033 A1    May 29, 2003

(30) Foreign Application Priority Data

Oct. 26, 2001    (GB)  ................................ 0125713.8

(51) Int. Cl.
*G06G 7/48*    (2006.01)
(52) U.S. Cl. ........................................ 703/10; 382/199
(58) Field of Classification Search .................. 703/10, 703/2; 363/73; 382/199; 345/419, 420
See application file for complete search history.

(56) References Cited

U.S. PATENT DOCUMENTS

| | | | |
|---|---|---|---|
| 4,926,394 A * | 5/1990 | Doyen .......................... | 367/73 |
| 5,170,440 A * | 12/1992 | Cox ............................ | 382/199 |
| 5,838,634 A | 11/1998 | Jones et al. | |
| 5,905,657 A | 5/1999 | Celniker | |
| 6,061,412 A * | 5/2000 | Stucker et al. .............. | 376/217 |
| 6,662,147 B1 * | 12/2003 | Fournier et al. .............. | 703/10 |
| 6,826,483 B1 * | 11/2004 | Anderson et al. ............. | 702/13 |
| 6,917,564 B1 * | 7/2005 | Leaney ........................ | 367/73 |
| 6,950,786 B1 * | 9/2005 | Sonneland et al. ............ | 703/2 |

FOREIGN PATENT DOCUMENTS

WO    01/33481    5/2001

* cited by examiner

*Primary Examiner*—Albert W. Paladini
(74) *Attorney, Agent, or Firm*—Patterson, Thuente, Skaar & Christensen, P.A.

(57) ABSTRACT

A method is provided of combining first and second models of a common region of space, such as a region of the earth below the surface, to form a third model. Common points have different positions in the first and second models. A predetermined correlation exists between the positions of the common points in the first model and the positions of points of interest in the first model. The positions of the common points in the third model are derived from the common point positions in the first and second models. The positions in the third model of the points of interest are derived from the positions of the common points in the third model and from the predetermined correlation.

26 Claims, 3 Drawing Sheets

METHOD OF COMBINING SPATIAL MODELS

BACKGROUND

The present invention relates to a method of combining at least two models of a common region of space to form a resultant model. Such a method may be used, for example, to improve a geological model of a region when exploring for hydrocarbon reserves.

In order to search for and guide the exploitation of hydrocarbon reserves such as oil and gas, it is known to construct geological models of the earth from measurements obtained by various techniques. These techniques include seismic surveying and the use of magnetometers and gravity measurements. Such geological models give information about the geological structure of the earth below the surface or below the seabed and allow potential commercially exploitable reserves of hydrocarbons to be identified. Such models are also used for guiding the drilling of wellbores to test for the actual presence of hydrocarbons or to be used as production wells for exploiting identified hydrocarbon reserves.

The measurements obtained by such techniques are subject to inaccuracies, for example resulting from inaccuracies in the measuring instruments or techniques involved or inaccuracies resulting from imperfect knowledge of the geology. Models obtained by different measurement techniques are subject to different levels of inaccuracies so that different models of the same region predict different locations for geological formations.

It is known to make use of geological models when drilling a well and to make measurements during the drilling process. Measurements made during drilling are generally relatively accurate whereas the uncertainties in position in geological models are relatively large. Thus, when a well is being drilled and a boundary or interface between different rock strata is detected, the well measurement is used to correct the position of the boundary in the geological model being used to guide the drilling. However, the correction which is provided by such techniques is very limited and amounts to correcting the position, such as depth, of the boundary which has been encountered and possibly providing the identical correction to points in a small region adjacent the drill bit.

SUMMARY

According to a first aspect of the invention, there is provided a method of combining at least two models of a common region of space to form a resultant model, in which the positions and the positional uncertainties of at least one common point in the at least two models are known, comprising deriving a position and a positional uncertainty in the resultant model of the at least one common point from the positions and the positional uncertainties of the at least one common point in the at least two models.

The positional uncertainties may be represented as variances and covariances.

The common region may be a region of the earth.

Each of the at least two models may be a physical model based on measurements.

A first of the at least two models may be a geological model, for example based on at least one of seismic, magnetometer and gravity measurements. A second of the at least two models may be based on wellbore log information.

The at least one common point may comprise a plurality of common points.

A predetermined positional relationship may exist between the position of at least one point of interest in a or the first of the at least two models and the position of the at least one common point in the first model and the position of the at least one point of interest in the resultant model may be derived from the position of the at least one common point in the resultant model and from the predetermined positional relationship.

The at least one point of interest may comprise a plurality of points of interest. The predetermined positional relationship may be represented as a correlation. As an alternative, the predetermined positional relationship may be represented as covariances.

The predetermined positional relationship may be a function of position. The predetermined positional relationship may be a decreasing function of distance between the at least one common point and the at least one point of interest. The predetermined positional relationship may be a decreasing function of measurement noise between the at least one common point and the at least one point of interest.

A further predetermined positional relationship may exist between the position of the at least one common point in a or the second of the at least two models and the position of at least one further point of interest in the second model, the method comprising deriving a position in the third model of the at least one further point of interest from the position of the at least one common point in the third model and from the further predetermined positional relationship.

The positions of the at least one common point in the at least two models may be different from each other. The position of the at least one common point in the resultant model may be the same as the position of the at least one common point in a or the second of the at least two models.

The method may comprise generating a or the second of the at least two models progressively and forming the resultant model upon the appearance in the second model of a first of the common points. The method may comprising replacing a or the first of the at least two models with the previously formed resultant model and forming a new resultant model each time a further one of the common points appears in the second model. At least one portion of the new resultant model containing at least one common point which has previously appeared may be unchanged when the new resultant model is formed. The further one of the common points may be in a surface and the at least one unchanged portion may be a volume bounded by the surface.

The first model may be a geological model and the second model may be generated during drilling of a wellbore. The surface may be a boundary between different layers and the appearance of the further one of the common points may be indicated when the borehole penetrates the boundary.

According to further aspects of the invention, there are provided a computer program for programming a computer to perform a method according to the first aspect of the invention, a medium containing such a program and a computer programmed by such a program.

DETAILED DESCRIPTION

Although the present technique may be used to combine spatial models of any type, the use of this technique to combine different models of the same region of the earth will be described hereinafter by way of example and without loss of generality.

Figure 1:
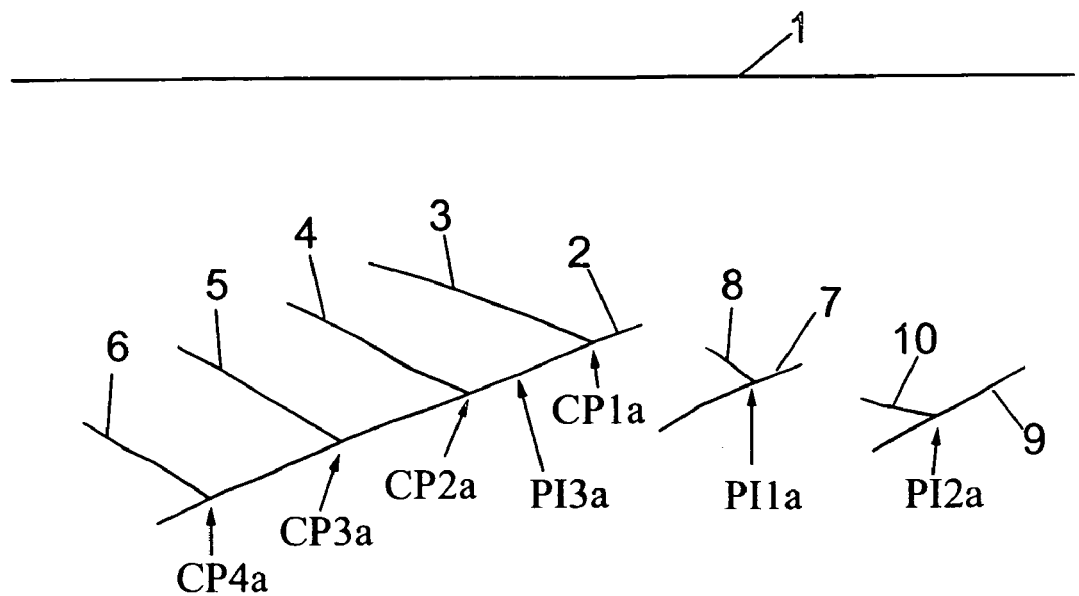
FIG. 1 is a diagram illustrating a first model of a region of the earth.

FIG. 1 illustrates a first model of a region of the earth, for example obtained from a seismic survey. The drawing shows a cross section in which the boundaries between various geological layers are shown. A boundary 2 is intersected by further boundaries 3 to 6 and the points of intersection are indicated as common points CP1$a$ to CP4$a$. Similarly, a boundary 7 is intersected by another boundary 8 at a first point of interest PI1$a$. A further boundary 9 is intersected by yet another boundary 10 at a second point of interest PI2$a$. A third point of interest lying on the boundary 2 between the common points CP1$a$ and CP2$a$ is indicated at PI3$a$.

The positions of all of the common points CP1$a$ to CP4$a$ and the points of interest PI1$a$ to PI3$a$ are determined by processing of the seismic data obtained during seismic exploration of the region. In particular, the positions of each of these points relative to a reference point is determined by the processing and these are the positions of the points in the first model. However, the technique used to generate the first model has inherent inaccuracies and uncertainties so that the positions of the various points in the earth are generally different from the positions in the first model. In generating the first geological model from the seismic data, imperfect knowledge of the structure and properties of the region of the earth means that various assumptions have to be made. Also, the specific measurement techniques used during the seismic surveying have intrinsic inaccuracies as with any measuring technique. The uncertainties in the positions of the various points in the first model are calculated and associated with the respective points.

It is also possible to assign values of correlation between each of the common points CP1$a$ to CP4$a$ and each of the points of interest PI1$a$ to PI3$a$. As described hereinafter, these correlations may be expressed as covariances. Thus, the point of interest PI1$a$ is assumed to be relatively near the common points CP1$a$ to CP4$a$ and with relatively little noise, such as unidentified reflections, therebetween. The position of the point of interest PI1$a$ is therefore correlated to the positions of the points of interest CP1$a$ to CP4$a$ with a medium degree of correlation.

The point of interest PI2$a$ is much further away from the common points CP1$a$ to CP4$a$ and, although not shown for the sake of clarity, it is assumed that the intervening portion of the region of the earth is shown in the first model as having a relatively complex structure, for example with many unidentified reflections. The correlation between the position of the point of interest PI2$a$ and each of the common points CP1$a$ to CP4$a$ is therefore very low and, by way of example, is assumed to be zero in the first model.

The point of interest PI3$a$ is located on the boundary 2, which also contains the common points CP1$a$ to CP4$a$. There is therefore a very high correlation between the various points on the boundary 2 and, for purposes of illustration, it is assumed that this correlation has the maximum value of 1.

Although three specific points of interest have been illustrated in FIG. 1, any point within the first model and indeed every point in the first model may be considered as a point of interest. Thus, a value of the correlation between every point in the model and each of the common points CP1$a$ to CP4$a$ can be assigned based on various techniques which do not form part of the present invention.

Figure 2:
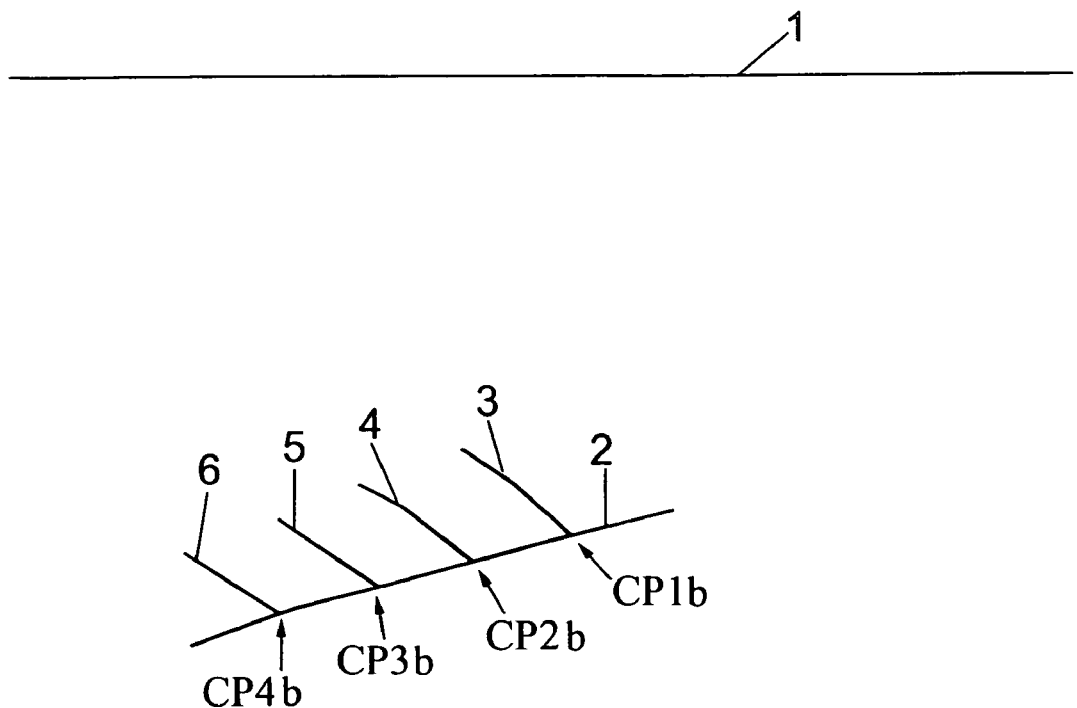
FIG. 2 is a diagram illustrating a second model of the same region of the earth.

FIG. 2 illustrates a second model of the same region of the earth below the surface 1. The second model may, for example, have been obtained by processing data obtained by magnetic or gravity measurements of the region. The second model also identifies the boundaries 2 to 6 and allows the positions in the second model of common points CP1$b$ to CP4$b$ to be determined. Because of inaccuracies and uncertainties in the specific technique used to produce the second model, the positions of the common points CP1$b$ to CP4$b$ are subject to uncertainties which can be calculated and which are ascribed to these points.

Figure 3:
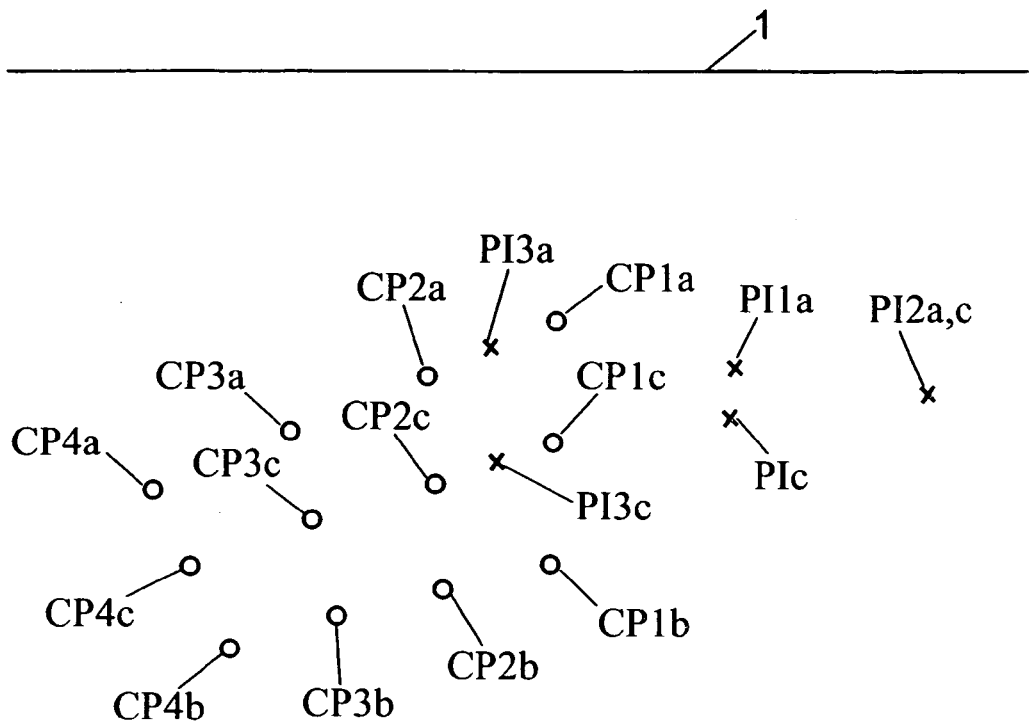
FIG. 3 is a diagram of the same region of the earth illustrating how the first and second models are combined.

The common points CP1$b$ to CP4$b$ in the second model shown in FIG. 2 correspond to the common points CP1$a$ to CP4$a$, respectively, in the first model and to the same physical points in the region of the earth. Thus, if the techniques used to obtain the two models were perfect such that there were no inaccuracies or uncertainties in the positions of the common points, then the positions of the common points CP1$b$ to CP4$b$ as determined in the second model would be identical to the positions of the common points CP1$a$ to CP4$a$ as determined in the first model. However, as shown in FIG. 3, because of the inaccuracies and uncertainties in the first and second models, the two models generally give different positions for the corresponding pairs of common points. The present technique combines the first and second models so as to produce a resultant or third model which represents a more accurate model of the same region of the earth and, in particular, which places the common points and the points of interest closer to the actual locations of these points within the earth. Essentially, the technique involves deriving the position of each common point from the positions and uncertainties of the corresponding common points in the two models.

The associated positional uncertainties are calculated for the third model and are generally less than for each of the first and second models. FIG. 3 illustrates an example where the uncertainties in position data in the two models are approximately the same. Thus, the resulting common points CP1$c$ to CP4$c$ in the third model are approximately mid way between the corresponding pairs of common points in the first and second models. If the uncertainties associated with the position data in one model were much lower than in the other model, then the common points in the third model would be closer to the common points in the one model. It is also possible for the positional data in one of the models to be much more accurate than that in the other model such that the positional data in the more accurate model is assumed to have zero uncertainty. In such a case, the positions of the common points in the third model are the same as in the more accurate model.

The second model shown in FIG. 2 does not provide any positional data about the points of interest PI1$a$ to PI3$a$ in the third model. However, as described hereinbefore, these points of interest are correlated in position to different degrees with the common points in the first model and this correlation is used to derive positions for the points of interest in the third model. As mentioned hereinbefore, every point which is not a common point in the region of the earth may be treated as a point of interest so that this technique allows a more accurate model to be obtained of the whole region. For the sake of simplicity, only the three points of interest PI1a to PI3a will be considered.

As described hereinbefore, the point of interest PI3a is assumed to have complete correlation with the common points CP1a to CP4a in the first model. This is used when generating the third model so that the corresponding point of interest PI3c as shown in FIG. 3 is positioned between the common points CP1c and CP2c so that, relative to these common points, it is positioned similarly to the position of the point of interest PI3a relative to the common points CP1a and CP2a in the first model. As illustrated in FIG. 3, this amounts to a translation relative to the position in the first model but, as shown in FIG. 3, the translation is different from that of each of the common points. The present technique allows structures or sub-regions to be moved by translations, rotations, and changes of scale. Thus, the line connecting the common points in the first model and ending at the common points CP1a and CP4a is translated, rotated slightly, and reduced slightly in length to form the corresponding line in the third model. Similarly, the corresponding line in the second model is translated, slightly rotated and slightly increased in length to form the corresponding line in the third model.

The point of interest PI1a in the first model is assumed to have approximately a 50% correlation with the common points CP1a to CP4a. The corresponding point of interest PIc in the third model is generated by "extrapolating" the transformation of the common points but "reducing" the actual displacement between the two models in accordance with the partial correlation. However, the point of interest PI2a is assumed to have zero correlation with the common points so that its position PI2c in the third model is the same as its position PI2a in the first model.

Figure 4:
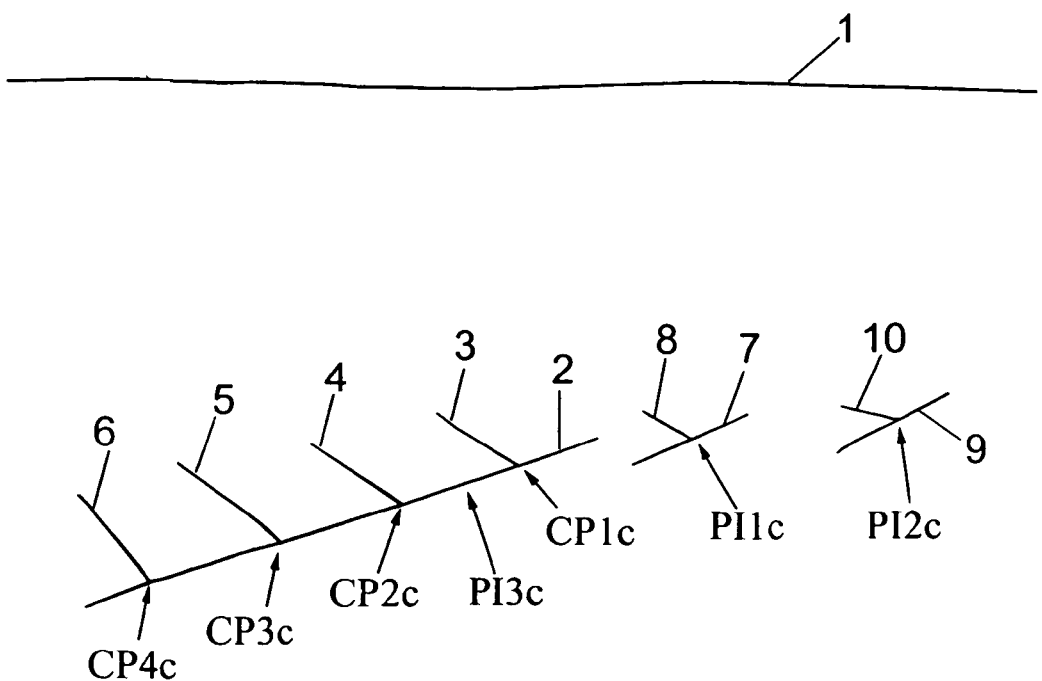
FIG. 4 is a diagram of a model of the same region of the earth obtained from the models shown in FIGS. 1 and 2.

FIG. 4 illustrates the third model with the common points CP1c to CP4c and the points of interest PI1c to PI3c in the positions corresponding to FIG. 3. By using the information in the first and second models, the third model is generated and represents a more accurate model of the structure and geology of the region of the earth. In particular, the positions of the various points in the third model are substantially closer to the actual physical locations of these points in the earth.

This technique may be used to combine different models which have previously been obtained of the same region of the earth, for example using different surveying techniques and/or different processing techniques. By improving the knowledge of the structure of the earth, such a technique may be used to direct more accurately the search for valuable reserves such as hydrocarbon reserves. However, another form of the same technique may be used during the actual drilling of a wellbore for test or production purposes. For example, the first model may be as illustrated in FIG. 1 and represents the geology of the region of the earth below the surface 1, obtained from seismic surveying. The second model is obtained in real time during the drilling process, for example from position measuring equipment at or near the drill bit which may be present for guiding the drilling operation. Also, the position of the drill bit with respect to the geology revealed in the first model can be at least partially determined in accordance with the waste material removed by the drilling operation. In particular, a relatively accurate determination can be obtained of the position of each boundary between different geological strata. The present technique may be used to improve the guidance of the drilling operation so as to improve the chances of hitting a particular drilling target, such as the top of a hydrocarbon reservoir.

When using this technique, the second model is constructed as the drilling progresses. When the drill bit intersects or arrives at a common point which can be identified in the first model, such as penetration of a specific layer, the more accurate positional information from the second model can be used to update or improve the first model so as to generate a third model. For example, if the wellbore passes through the boundary 3 shown in FIG. 1, the position, at least in the direction of drilling, of the boundary or surface 3 will be known to a much greater degree of accuracy than in the first model. This improved positional information in the second model is thus used to generate a third model, making use of the already known correlation in the first model, to improve the positional data in the first model so as to generate the third model.

Each time the drill arrives at a common point, such as another boundary between strata, a further third model may be generated from the new positional information in the second model and from the previously generated third model which is iteratively used as the first model. However, the previously generated third model which is now used as the first model may be updated only in certain sub-regions of the region of the earth. For example, such updating to generate the new third model may only take place "ahead" of the position of the drill bit so that the common points which have already been located in the second model during the drilling are not displaced but retain their positions in the new third model. In particular, each boundary which has already been intersected by the wellbore retains its position in the new third model because the improved positional information obtained by the real time generation of the second model is relevant only to the lower strata or boundaries and does not improve the positional information of the previous common points. Thus, a volume of the region bounded by a newly intersected boundary and containing the previously located common points retains its structure in the new third model. This may, for example, be achieved by ascribing zero correlation to all points in the volume with respect to new common points.

Covariance matrices for wellbore and geological model positions may be derived by calculating the effects from all relevant error sources, such as sensors, operational and environmental effects, processing techniques, and interpretation. Each element in the covariance matrices is dependent on the relationships between the error sources and the coordinates, and on the error source characteristics, such as whether random or systematic. Any suitable techniques may be used but do not form part of this invention. Suitable known techniques include that disclosed in "wellbore portion accuracy analysed by a new and general method", T. Torkildsen, J. Bang, O. H. Inderhang and M. Pollard, IADC 1997 Warsaw Conference, the contents of which are incorporated herein by reference.

Although the above examples have been described for the case where first and second models are combined to form a third model, the present technique is not limited to this. Thus, the present technique may be used to combine two or more than two models so as to provide a resultant model.

Also, the present technique can be applied where there are no points of interest to be considered. In such a case, the technique is applied to the common points and the resultant model has corresponding common points whose positions are more accurately known than in the original models. Where the positions of each of at least some of the common points are different in the different original models, the position of the or each corresponding common point in the resultant model is derived from the positions and the positional uncertainties of the common points in the original models. The position of each common point should therefore be closer to the actual position and the degree of positional uncertainty is generally less than in each of the original models.

There may be applications of the technique where the positions of each common point in the original models are the same. In such a case, the technique may still be applied and the positions of the common points in the resultant model will be unchanged. However, the positional uncertainties in the resultant model are generally less than in the original model so that the resultant model represents an improved estimation of the physical region.

Although the above examples refer to a case where there is a correlation between the points of interest and the common points in the first model, the present technique is not limited to such correlation when determining the positions of the points of interest in the third or resultant model. Thus, any predetermined positional relationship between the positions in the first model (or any model) and the common points may be used and the predetermined positional relationship may be used to provide improved estimates of the positions of the points of interest in the third or resultant model. As described in more detail hereinafter, the predetermined positional relationship maybe expressed in the form of variances and covariances.

In the above examples, the first "geological" model has been described as being obtained from seismic exploration. However, the geological model could be derived from other data and may be any model representing geophysical properties of the region of the earth. Such models include petrophysical models, reservoir models and stratigraphical models.

Where all of the original models which are to be used in deriving the resultant model are referred to the same coordinate axes, it is not necessary to perform coordinate transformations in order to combine the models. However, in those cases where different coordinate systems are used in different models, the present technique involves performing coordinate transformation so that the models can be combined to form the resultant model. This is described in more detail hereinafter.

Definitions and Notations

The following detailed description of the present method uses a main co-ordinate system which is right-handed and orthogonal with the horizontal x-axis in the northern direction, the y-axis in the eastern direction and the z-axis in the vertical downward direction. The position of a point is mathematically represented as:

$$X_i^T = (x_i, y_i, z_i)$$

Multiple points are represented in a joint vector:

$$X^T = (x_1 y_1 z_1 x_2 y_2 z_2 \ldots x_n y_n z_n)$$

$$X^T = (X_1^T X_2^T \ldots X_n^T)$$

A secondary right-handed orthogonal co-ordinate system U is linked directly to the plane for a geological marker. The u-axis is along the dip direction in the plane and the v-axis is the horizontal axis in the plane (to the right when observed along the dip direction). The w-axis is perpendicular to the dip plane. For example, the position of a point in this coordinate system is represented as:

$$U_i^T = (u_i, v_i, w_i)$$

Transformations

Using the notation $\beta_i$ = dip angle (positive or negative)

$\alpha_i$ = azimuth for the dip angle direction the orthogonal transformation from X to U and vice versa is expressed below:

$$U_i = \Delta U_i + R_i \cdot X = \begin{pmatrix} u_i \\ v_i \\ w_i \end{pmatrix} = \begin{pmatrix} \Delta u_i + ru_i \cdot X \\ \Delta v_i + rv_i \cdot X \\ \Delta w_i + rw_i \cdot X \end{pmatrix}$$

$$X_i = \Delta X_i + R_i^{-1} \cdot U_i = \Delta X_i + R_i^T \cdot U_i$$

where $$R_i = \begin{pmatrix} \cos\alpha_i \cdot \cos\beta_i & \sin\alpha_i \cdot \cos\beta_i & \sin\beta_i \\ -\sin\alpha_i & \cos\alpha_i & 0 \\ -\cos\alpha_i \cdot \sin\beta_i & -\sin\alpha_i \cdot \sin\beta_i & \cos\beta_i \end{pmatrix} = \begin{pmatrix} ru_i \\ rv_i \\ rw_i \end{pmatrix}$$

and $\Delta U_i$ is the position of the X system origin in the U system and $\Delta X_i$ is the position of the U system origin in the X system. Thus:

$$\Delta U_i = -R_i \cdot \Delta X_i$$

Uncertainties

Covariance Notation

The covariance matrix for a position is expressed as:

$$\sum X_i = \begin{pmatrix} \text{Var}(x_i) & \text{Cov}(x_i, y_i) & \text{Cov}(x_i, z_i) \\ \text{Cov}(y_i, x_i) & \text{Var}(y_i) & \text{Cov}(y_i, z_i) \\ \text{Cov}(z_i, x_i) & \text{Cov}(z_i, y_i) & \text{Var}(z_i) \end{pmatrix}$$

For a multiple position vector this gives $$\sum X = \begin{pmatrix} \Sigma_{X_1} & \Sigma_{X_1 X_2} & \ldots & \Sigma_{X_1 X_n} \\ \Sigma_{X_2 X_1} & \Sigma_{X_2} & \ldots & \Sigma_{X_2 X_n} \\ \ldots & \ldots & \ldots & \ldots \\ \Sigma_{X_n X_1} & \Sigma_{X_n X_2} & \ldots & \Sigma_{X_n} \end{pmatrix}$$

Error Propagation

If $U_i$ is linear function of $X_i$ like the orthogonal transformation:

$$U_i = \Delta U_i + R_i \cdot X_i$$

then $$\Sigma_{U_i} = R_i \cdot \Sigma_{X_i} \cdot R_i^T \text{ and } \Sigma_{X_i} = R_i^T \cdot \Sigma_{U_i} \cdot R_i$$

For a multiple point vector:

$$\Sigma_U = R \cdot \Sigma_X \cdot R^T \text{ and } \Sigma_X = R^T \cdot \Sigma_U \cdot R$$

where $$R = \begin{pmatrix} R_1 & 0 & 0 & \ldots \\ 0 & R_2 & 0 & \ldots \\ 0 & 0 & R_3 & \ldots \\ \ldots & \ldots & \ldots & \ldots \end{pmatrix}$$

The method is based on connecting the different systems through common points identified in both systems. The equations demonstrate the method for combining two models/systems denoted W and G.

We now introduce the following co-ordinate vectors concerning the common points:

$XW_1$—Common points in system/model W
$XG_1$—Common points in system/model G
XL—Relative positions from sensor in W to recognised geological marker in G, i.e. result from a logging tool which senses remote geological markers, resistivity, acoustic reflectors, etc.

The above vectors have the same dimension. An ideal match between the positions in the two systems gives:

$$XW_1 + XL = XG_1$$

This equation also expresses the main constraint which ties the two systems together. When geological markers are observed directly, e.g. in a well, XL=0.

Additionally we introduce:
$XW_2$—Other points of interest in system/model W
$XG_2$—Other points of interest in system/model G All the co-ordinate vectors are arranged like this:

$$X = \begin{pmatrix} XW_1 \\ XW_2 \\ XG_1 \\ XG_2 \\ XL \end{pmatrix}$$

with the corresponding covariance matrix, which is logically divided into sub-matrices, like this:

$$\Sigma_X = \begin{pmatrix} \Sigma_{XW_1} & \Sigma_{XW_1 XW_2} & \Sigma_{XW_1 XG_1} & \Sigma_{XW_1 XG_2} & 0 \\ \Sigma^T_{XW_1 XW_2} & \Sigma_{XW_2} & \Sigma_{XW_2 XG_1} & \Sigma_{XW_2 XG_2} & 0 \\ \Sigma^T_{XW_1 XG_1} & \Sigma^T_{XW_2 XG_1} & \Sigma_{XG_1} & \Sigma_{XG_1 XG_2} & 0 \\ \Sigma^T_{XW_1 XG_2} & \Sigma^T_{XW_2 XG_2} & \Sigma^T_{XG_1 XG_2} & \Sigma_{XG_2} & 0 \\ 0 & 0 & 0 & 0 & \Sigma_{XL} \end{pmatrix}$$

The 0 matrices are considered to be unquestionable. Some of the other non-symmetric matrices may also be 0; however they are kept non-zero to allow generality.

Least Squares Solution

By using a generalized least squares methodology, the new vector and covariance matrices are calculated like this:

$$\hat{X} = (I - \Sigma_X \cdot C_1^T \cdot (C_1 \cdot \Sigma_X \cdot C_1^T)^{-1} \cdot C_0) \cdot X$$

$$\Sigma_{\hat{X}} = (I + \Sigma_X \cdot C_1^T \cdot (C_1 \cdot \Sigma_X \cdot C_1^T)^{-1} \cdot C_0 \cdot \Sigma_X \cdot C_0^T \cdot (C_1 \cdot \Sigma_X \cdot C_1^T)^{-1} \cdot C_1) \cdot \Sigma_X - (\Sigma_X \cdot C_0^T \cdot (C_1 \cdot \Sigma_X \cdot C_1^T)^{-1} \cdot C_1 + \Sigma_X \cdot C_1^T \cdot (C_1 \cdot \Sigma_X \cdot C_1^T)^{-1} \cdot C_0) \cdot \Sigma_X$$

The least squares solution results in an optimised tie between the two systems and points outside the common points are moved correctly according to their correlation to the tie-in points.

The $C_1$ and $C_0$ matrices are dependent on which properties are to be achieved. The following solutions A and B are examples of realizations of two evident wanted properties. However, the way the models are constructed and the way data are organized make it possible to introduce any other wanted behaviour.

The computer work can be reduced drastically by deriving optimised algorithms:

using simplified algorithms for multiplication with unity matrices;
omitting multiplications with zero matrices;
reducing the dimension of the matrix to be inverted;
utilizing quadratic forms of the expression.

Solution A

This solution gives the average position for the common points in the two systems. The other points, in both systems, will receive coordinate changes through the correlation.

The $C_1$ and the $C_0$ matrices are identical:

$$C_1 = C_0 = (D0 - D0D)$$

D has a form and dimension dependent on the tie-in properties.

3D Tie-in

The 3D tie-in represents the situation where points can be identified and recognised in all directions (x, y, z). The matrix D becomes the unit matrix.

$$D = I$$

$$C_1 = C_0 = \begin{pmatrix} I & 0 & -I & 0 & I \\ 3n \cdot 3n & 3n \cdot 3k & 3n \cdot 3n & 3n \cdot 3l & 3n \cdot 3n \end{pmatrix}$$

where
I—unit matrix (quadratic)
0—zero matrix
n—number of common points, i.e. number of points in the vectors $XW_1 XG_1$ and XL
k—number of points in $XW_2$
l—number of points in $XG_2$ 1D Tie-in This case occurs where surfaces are identified. The tie is in force for the w direction only (perpendicular to the surface), and the D matrix comprises coefficients from the transformation from the X co-ordinate system to the U co-ordinate system.

$$D = \begin{pmatrix} rw_1 & 0 & \ldots & 0 \\ & rw_2 & \ldots & 0 \\ \ldots & \ldots & \ldots & \\ 0 & 0 & \ldots & rw_n \end{pmatrix}$$

All submatrices in D have dimensions in the ratio 1:3. Then:

$$C_1 = C_0 = \begin{pmatrix} D & 0 & -D & 0 & D \\ n \cdot 3n & n \cdot 3k & n \cdot 3n & n \cdot 3l & n \cdot 3n \end{pmatrix}$$

Solution B

In some situations, it may be desirable to keep one of the systems untouched. This means that the other system is transformed into the first system through the common points. Presupporting the W system to be held fixed, the C matrices are:

$$C_1 = \begin{pmatrix} D & 0 & -D & 0 & D \\ I & 0 & 0 & 0 & 0 \\ 0 & I & 0 & 0 & 0 \\ 0 & 0 & 0 & 0 & I \end{pmatrix}$$

$$C_0 = \begin{pmatrix} D & 0 & -D & 0 & D \\ 0 & 0 & 0 & 0 & 0 \\ 0 & 0 & 0 & 0 & 0 \\ 0 & 0 & 0 & 0 & 0 \end{pmatrix}$$

The dimensions are still determined by the number of points in the different co-ordinate vectors:

$$C_1 = \begin{pmatrix} D_{qn \cdot 3n} & 0_{qn \cdot 3k} & -D_{qn \cdot 3n} & 0_{qn \cdot 3l} & D_{qn \cdot 3n} \\ I_{3n \cdot 3n} & 0_{3n \cdot 3k} & 0_{3n \cdot 3n} & 0_{3n \cdot 3l} & 0_{3n \cdot 3n} \\ 0_{3k \cdot 3n} & I_{3k \cdot 3k} & 0_{3k \cdot 3n} & 0_{3k \cdot 3l} & 0_{3k \cdot 3n} \\ 0_{3n \cdot 3n} & 0_{3n \cdot 3k} & 0_{3n \cdot 3n} & 0_{3n \cdot 3l} & I_{3n \cdot 3n} \end{pmatrix}$$

where $qn = n$ for 1D tie-in and $qn = 3n$ for 3D tie-in

The dimensions in $C_0$ are analogous to those in $C_1$.

Relative Uncertainties

The relative uncertainty between any pair of points in the X vector are determined by the general formula:

$$\Sigma_{\Delta x} = B \cdot \Sigma_{\hat{X}} \cdot B^T$$

where B has the form:

$$B = \begin{pmatrix} 0 & \cdots & I_{3 \cdot 3} & 0 & \cdots & -I_{3 \cdot 3} & 0 & \cdots \end{pmatrix}$$

The unit matrices are placed logically in the right place according to the points of interest.

EXAMPLE

Tie-in of Geological Model to Wellbore

This is a subject which is normally solved by Solution B. The geological (G) model is transformed into the positions of the wellbore (W).

The geological model is geometrically made up by a number of planes (geological boundaries). Each boundary is represented by one point in the plane and the dip angle and the azimuth in dip direction. When we recognize a geological marker (boundary) in the wellbore, we have only the information that we are in the boundary plane; not where. This means, mathematically, that we have a 1D tie-in, rather than a 3D tie-in.

Figure 5:
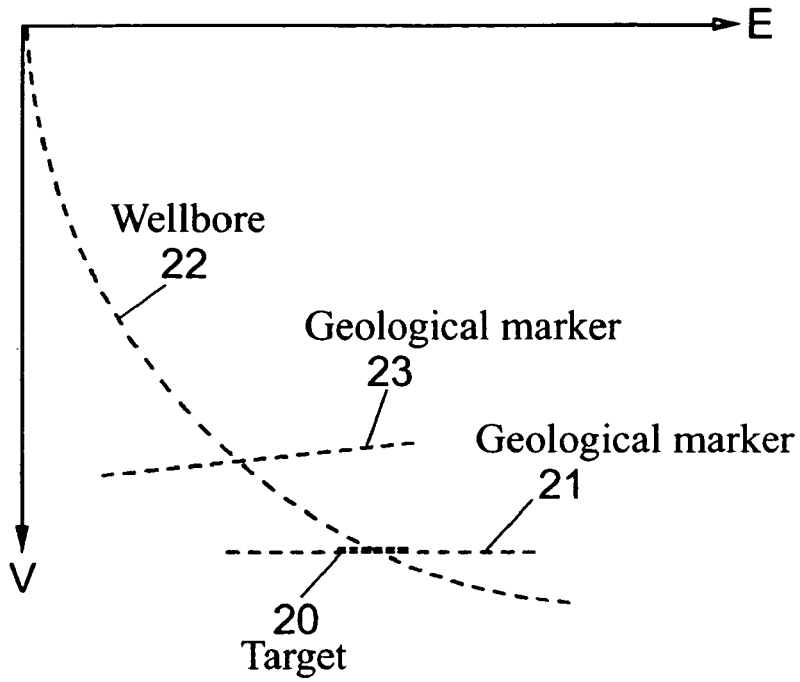
FIG. 5 is a diagram illustrating another first model and a wellbore.

FIG. 5 illustrates a case where a well is being drilled to hit a target 20 at a geological marker 21. However, the wellbore 22 will cross a geological marker 23 before the target 20 is reached. This gives the opportunity to have control of the positions in the geological model versus the positions in the wellbore before the critical phase (hitting the target) starts. Furthermore, the deviations of positions at the marker 23 in the two systems are utilised to enhance the positions and their accuracies in the geological model.

The following numerical example is simplified to deal with East and Vertical co-ordinates only. Furthermore, the L vector and its effect are removed in this calculation example.

The geological marker 23 (dip angle=−3.0 degree) is reached at a wellbore position that is 20 m and 60 m off the corresponding co-ordinates in the geological model.

The collocation leads to the geological markers 23 and 21 moving (−12.85−60.37) and (−13.55, −65.50), respectively. The co-ordinates for the target 20 at the geological marker 21 (and the associated wellbore co-ordinates) should therefore be changed to be identical to new co-ordinates for geological marker 21. (It should be noted that the co-ordinates themselves do not become identical for the wellbore and geological models at the geological marker 23. However, the geological marker surface goes through the actual wellbore position.)

The collocation further implies that the standard deviations for the relative position between geology and wellbore decreases from 106.65 m to 106.11 m in the East direction and decreases from 53.45 m to 6.29 m in the Vertical direction. The major enhancement in the Vertical direction is caused by the tie direction which is close to vertical (3 degree deflection).

|  |  | Co-ordinates | | | Standard deviations | | |
| --- | --- | --- | --- | --- | --- | --- | --- |
|  |  | Before Collocation | After Collocation | Difference | Before Collocation | After Collocation | Difference |
| Wellbore | E_1 | 1000.00 | 1000.00 | 0.00 | 11.00 | 11.00 | 0.00 |
|  | V_1 | 2410.41 | 2410.41 | 0.00 | 4.92 | 4.92 | 0.00 |
|  | E_2 | 1453.15 | 1453.15 | 0.00 | 11.52 | 11.52 | 0.00 |
|  | V_2 | 2621.72 | 2621.72 | 0.00 | 5.66 | 5.66 | 0.00 |
| Geology | E_1 | 1020.00 | 1007.15 | 12.85 | 98.63 | 98.09 | 0.54 |
|  | V_1 | 2470.41 | 2410.03 | 60.37 | 48.94 | 7.03 | 41.90 |
|  | E_2 | 1453.15 | 1439.61 | 13.55 | 106.03 | 105.47 | 0.56 |
|  | V_2 | 2621.72 | 2556.22 | 65.50 | 53.15 | 8.03 | 45.11 |
| Difference | E_1 | 20.00 | 7.15 | 12.85 |  |  |  |
| Geology − | V_1 | 60.00 | −0.37 | 60.37 |  |  |  |
| Wellbore | E_2 | 0.00 | −13.55 | 13.55 | 106.65 | 106.11 | 0.54 |
|  | V_2 | 0.00 | −65.50 | 65.50 | 53.45 | 6.29 | 47.16 |

Figure 6:
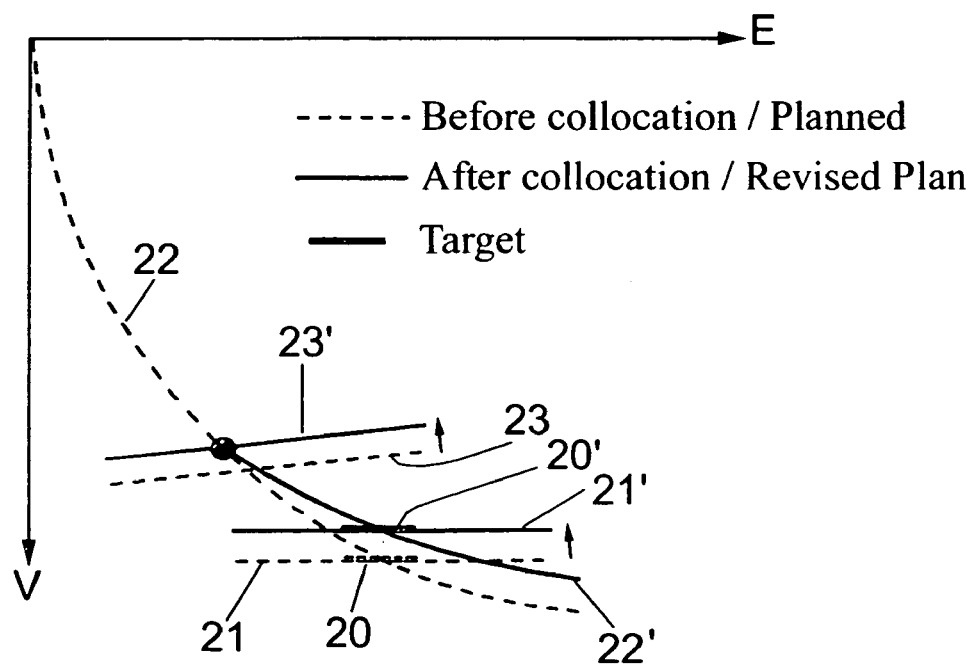
FIG. 6 is a diagram illustrating adjustment of the first model of FIG. 5 to form a third model.

FIG. 6 illustrates the originally planned borehole 22 and the new borehole 22' after revising the position data following the intersection with the marker 23. The revised positions of the first and second markers are shown at 23' and 21' and the revised position of the target at 20'.

The matrix $C_1$ is:

| 0.05 | 1.00 | 0.00 | 0.00 | −0.05 | −1.00 | 0.00 | 0.00 |
| 1.00 | 0.00 | 0.00 | 0.00 | 0.00 | 0.00 | 0.00 | 0.00 |
| 0.00 | 1.00 | 0.00 | 0.00 | 0.00 | 0.00 | 0.00 | 0.00 |
| 0.00 | 0.00 | 1.00 | 0.00 | 0.00 | 0.00 | 0.00 | 0.00 |
| 0.00 | 0.00 | 0.00 | 1.00 | 0.00 | 0.00 | 0.00 | 0.00 |

The covariance matrix before collocation is:

|  | W_E_1 | W_V_1 | W_E_2 | W_V_2 | G_E_1 | G_V_1 | G_E_2 | G_V_2 |
| --- | --- | --- | --- | --- | --- | --- | --- | --- |
| W_E_1 | 120.90 | −9.63 | 123.60 | −12.17 | 0.00 | 0.00 | 0.00 | 0.00 |
| W_V_1 | −9.63 | 24.21 | −11.99 | 27.21 | 0.00 | 0.00 | 0.00 | 0.00 |
| W_B_2 | 123.60 | −11.99 | 132.74 | −15.22 | 0.00 | 0.00 | 0.00 | 0.00 |
| W_V_2 | −12.17 | 27.21 | −15.22 | 32.08 | 0.00 | 0.00 | 0.00 | 0.00 |
| G_E_1 | 0.00 | 0.00 | 0.00 | 0.00 | 9727.74 | 0.00 | 10251.68 | 0.00 |
| G_V_1 | 0.00 | 0.00 | 0.00 | 0.00 | 0.00 | 2394.76 | 0.00 | 2598.00 |
| G_E_2 | 0.00 | 0.00 | 0.00 | 0.00 | 10251.68 | 0.00 | 11241.63 | 0.00 |
| G_V_2 | 0.00 | 0.00 | 0.00 | 0.00 | 0.00 | 2598.00 | 0.00 | 2824.85 |

The covariance matrix after collocation is:

|  | W_E_I | W_V_1 | W_E_2 | W_V_2 | G_E_1 | G_V_1 | G_E_2 | G_V_2 |
| --- | --- | --- | --- | --- | --- | --- | --- | --- |
| W_E_1 | 120.90 | −9.63 | 123.60 | −12.17 | −0.69 | −3.26 | −0.73 | −3.54 |
| W_V_1 | −9.63 | 24.21 | −11.99 | 27.21 | 4.99 | 23.44 | 5.26 | 25.43 |
| W_E_2 | 123.60 | −11.99 | 132.74 | −15.22 | −1.16 | −5.45 | −1.22 | −5.91 |
| W_V_2 | −12.17 | 27.21 | −15.22 | 32.08 | 5.59 | 26.28 | 5.90 | 28.51 |
| G_E_1 | −0.69 | 4.99 | −1.16 | 5.59 | 9621.45 | −499.28 | 10139.67 | −541.66 |
| G_V_1 | −3.26 | 23.44 | −5.45 | 26.28 | −499.28 | 49.44 | −526.18 | 53.64 |
| G_E_2 | −0.73 | 5.26 | −1.22 | 5.90 | 10139.67 | −526.18 | 11123.59 | −570.83 |
| G_V_2 | −3.54 | 25.43 | −5.91 | 28.51 | −541.66 | 53.64 | −570.83 | 64.55 |

Such a method may be characterised by:

The core method is point-based (3D), i.e. cells in a gridded geological model.

Least squares estimation which supports both un-correlated and correlated observations with different weights.

Flexible with respect to tie-on mechanisms by using appropriate constraints.

Geological models described by zones between geological boundaries (geological markers) are reformulated into the point-based scheme before applying the general methodology.

Correlation properties are represented by covariances rather than separate parameters.

Typical applications include:

Combination of any geological and/or petrophysical models into one common and unified model.

Updating geological models with log information (detection of markers) which are measured in a wellbore.

Calculation of relative positions and uncertainties for the purpose of targeting oil/gas reservoir zones.

The achievements of using the method can be described by:

Collocating all geological/petrophysical information into one unified model in the most optimal way. The result is a model with the overall lowest position uncertainties Optimising drilling program and targeting of oil/gas reservoirs, i.e. increasing hitting probabilities.

What is claimed is:

1. A method of creating a unified model of a common region of space, said method comprising, supplying a first model of the common region of space, said first model including at least one point representing a feature in the common region of space, said point including a known positional uncertainty value with respect to the first model, supplying a second model of the common region of space, said second model including at least one point representing the feature in the common region of space, said point including a known positional uncertainty value with respect to the second model, combining at least the first model and the second model of the common region of space to form a resultant model, deriving a position and a positional uncertainty in said resultant model of said at least one common point from the positions and the positional uncertainties of said point from the first model and the point from the second model corresponding to the same feature.

2. A method as claimed in claim 1, in which said positional uncertainties are represented as variances and covariances.

3. A method as claimed in claim 1, in which said common region is a region of the earth.

4. A method as claimed in claim 1, in which each of said at least two models is a physical model based on measurements.

5. A method as claimed in claim 4, in which said common region is a region of the earth and a first of said at least two models is a geological model.

6. A method as claimed in claim 5, in which said geological model is based on at least one of seismic, magnetometer and gravity measurements.

7. A method as claimed in claim 5, in which a second of said at least two models is based on wellbore log information.

8. A method as claimed in claim 1, in which said at least one common point comprises a plurality of common points.

9. A method as claimed in claim 1, in which a predetermined positional relationship exists between a position of at least one point of interest in a first of said at least two models and said position of said at least one common point in said first model, and in which a position of said at least one point of interest in said resultant model is derived from a position of said at least one common point in said resultant model and from said predetermined positional relationship.

10. A method as claimed in claim 9, in which said at least one point of interest comprises a plurality of points of interest.

11. A method as claimed in claim 9, in which said predetermined positional relationship is represented as a correlation.

12. A method as claimed in claim 9, in which said predetermined positional relationship is represented as covariances.

13. A method as claimed in claim 9, in which said predetermined positional relationship is a function of position.

14. A method as claimed in claim 13, in which said predetermined positional relationship is a decreasing function of distance between said at least one common point and said at least one point of interest.

15. A method as claimed in claim 13, in which said predetermined positional relationship is a decreasing function of measurement noise between said at least one common point and said at least one point of interest.

16. A method as claimed in claim 9, in which a further predetermined positional relationship exists between a position of said at least one common point in a second of said at least two models and a position of at least one further point of interest in said second model, said method comprising deriving a position in said third model of said at least one further point of interest from a position of said at least one common point in said third model and from said further predetermined positional relationship.

17. A method as claimed in claim 9, in which said position of said at least one common point in said resultant model is the same as a position of said at least one common point in a second of said at least two models.

18. A method as claimed in claim 1, comprising generating a second of said at least two models progessively and forming said resultant model upon an appearance in said second model of a first of said common points.

19. A method as claimed in claim 18, comprising replacing a first of said at least two models with a previously formed resultant model and forming a new resultant model each time a further one of said common points appears in said second model.

20. A method as claimed in claim 19, in which at least one portion of said new resultant model containing at least one of said common points which has previously appeared is unchanged when said new resultant model is formed.

21. A method as claimed in claim 20, in which said further one of said common points is in a surface and said at least one unchanged portion is a volume bounded by said surface.

22. A method as claimed in claim 18, in which said first model is a geological model and said second model is generated during drilling of a wellbore.

23. A method as claimed in claim 22, in which said further one of said common points is in a surface, said at least one unchanged portion is a volume bounded by said surface, said surface is a boundary between different layers, and said appearance of said further one of said common points is indicated when said borehole penetrates said boundary.

24. A computer program for programming a computer to perform a method as claimed in claim 1.

25. A medium containing a program as claimed in claim 24.

26. A computer programmed by a program as claimed in claim 24.

* * * * *